United States Patent
Scott et al.

(10) Patent No.: US 7,864,792 B2
(45) Date of Patent: Jan. 4, 2011

(54) LOAD BALANCING FOR COMMUNICATIONS WITHIN A MULTIPROCESSOR COMPUTER SYSTEM

(75) Inventors: Steven L. Scott, Chippewa Falls, WI (US); Dennis C. Abts, Eleva, WI (US); William J. Dally, Stanford, CA (US)

(73) Assignee: Cray, Inc., Seattle, WA (US)

( * ) Notice: Subject to any disclaimer, the term of this patent is extended or adjusted under 35 U.S.C. 154(b) by 255 days.

(21) Appl. No.: 12/107,019

(22) Filed: Apr. 21, 2008

(65) Prior Publication Data

US 2009/0041049 A1    Feb. 12, 2009

Related U.S. Application Data

(60) Provisional application No. 60/925,470, filed on Apr. 20, 2007.

(51) Int. Cl.
*H04L 12/56* (2006.01)

(52) U.S. Cl. .................................. 370/419; 370/392

(58) Field of Classification Search ................. 370/419, 370/395, 406, 230, 392
See application file for complete search history.

(56) References Cited

U.S. PATENT DOCUMENTS

| | | | |
|---|---|---|---|
| 5,179,558 A * | 1/1993 | Thacker et al. | 370/406 |
| 5,201,056 A * | 4/1993 | Daniel et al. | 712/41 |
| 6,434,662 B1 * | 8/2002 | Greene et al. | 711/108 |
| 7,190,696 B1 * | 3/2007 | Manur et al. | 370/392 |
| 7,227,870 B2 * | 6/2007 | Sano et al. | 370/419 |
| 7,403,531 B2 * | 7/2008 | Ho et al. | 370/395.4 |
| 2008/0181103 A1 * | 7/2008 | Davies | 370/230 |

* cited by examiner

*Primary Examiner*—Thong H Vu
(74) *Attorney, Agent, or Firm*—Schwegman, Lundberg & Woessner, P.A.

(57) ABSTRACT

In a system having a N output ports, wherein N is an integer greater than one, a method of distributing packets across the plurality of output ports. A packet having two or more fields is received and a first number is computed as a function of one or more of the plurality of fields. A second number is computed that is modulo base N of the first number and an output port is selected as a function of the second number.

22 Claims, 6 Drawing Sheets

LOAD BALANCING FOR COMMUNICATIONS WITHIN A MULTIPROCESSOR COMPUTER SYSTEM

RELATED APPLICATIONS

This application claims the priority benefit of U.S. Provisional Application Ser. No. 60/925,470 filed Apr. 20, 2007, the contents of which is incorporated herein by reference in its entirety.

This application is related to U.S. patent application Ser. No. 12/107,011, entitled "HIGH-RADIX INTERPROCESSOR COMMUNICATIONS SYSTEM AND METHOD", filed on Apr. 21, 2008; to U.S. patent application Ser. No. 12/352,443, entitled "HIGH-RADIX INTERPROCESSOR COMMUNICATIONS SYSTEM AND METHOD", filed on Jan. 12, 2009; to U.S. patent application Ser. No. 12/107,036, entitled "SPECULATIVE FORWARDING IN A HIGH-RADIX ROUTER", filed on Apr. 21, 2008; and to U.S. patent application Ser. No. 12/107,016, entitled "FLEXIBLE ROUTING TABLES FOR A HIGH-RADIX ROUTER", filed on Apr. 21, 2008, each of which is incorporated herein by reference in its entirety.

FEDERALLY SPONSORED RESEARCH OR DEVELOPMENT

The U.S. Government has a paid-up license in this invention and the right in limited circumstances to require the patent owner to license others on reasonable terms as provided for by the terms of contract No. MDA904-02-3-0052, awarded by the Maryland Procurement Office.

BACKGROUND OF THE INVENTION

1. Field of the Invention

The present invention is related to multiprocessor computer systems, and more particularly to load balancing in communications within a multiprocessor computer systems.

2. Background Information

Often, in multiprocessor computer systems, there are multiple paths for the transfer of data between compute nodes. Given a distribution of packets being exchanged among processors on a network, some network links will typically carry more traffic than other network links. These "hot spots" can become saturated, causing network congestion that slows down the progress of packets traversing the bottlenecked links, and also causing backups in the network that can slow the progress of packets not routing through the bottlenecked links. The result is network performance degradation.

There are two primary techniques that have been used in the past to alleviate the network performance degradation caused by network hot spots: adaptive routing, and randomized oblivious routing. Adaptive routing techniques are discussed in the paper by Singh, A., Dally, W. J., Gupta, A. K., and Towles, B., "GOAL: a load-balanced adaptive routing algorithm for Torus networks, Proc. 30th Annual International Symposium on Computer Architecture", June 2003, pp. 194-205. In addition, a comprehensive treatment of interconnection networks is given in the book by William J. Dally and Brian Towles, *Principles and Practices of Interconnection Networks*. Morgan Kaufmann, 2004.

Adaptive routing allows packets to dynamically choose among multiple allowable paths to reach their destination. Most adaptive routing mechanisms are minimal, meaning that packets only choose amongst paths of the same number of hops. At each routing step, packets may only take hops that take them closer to the destination. Non-minimal adaptive routing algorithms allow packets to take longer paths in order to avoid local congestion. Adaptive routing can be quite effective in reducing the severity of hot spots from non-uniform traffic distributions.

Randomized oblivious routing does not use local congestion information to avoid hot spots, but rather uses randomization to minimize non-uniformities in the traffic. Valiant's algorithm (L. G. Valiant, "A scheme for fast parallel communication," SIAM Journal on Computing, 11(2):350-361, 19982), and the ROMM algorithm (T. Nesson and S. L. Johnsson, "ROMM routing on mesh and torus networks," Proc. 7$^{th}$ Annual ACM Symposium on Parallel Algorithms and Architectures, pp 275-287, 1995) are examples of randomized oblivious routing. In both Valiant's algorithm and the ROMM algorithm, packets are first routed from the source node to a random intermediate node, and then to the destination node.

Valiant's algorithm is non-minimal, choosing any intermediate node in the network. While it does an excellent job of smoothing traffic in the network, it doubles the average traffic load in the network.

The ROMM algorithm is minimal, choosing only intermediate nodes that lie within the bounding box defined by the source and destination nodes. While it does not increase average traffic load in the network, it does not do as effective a job of removing hot spots.

A significant problem with both adaptive and randomized oblivious routing that both approaches can reorder packets in the network Two packets sent from the same source to the same destination may be delivered in the opposite order from which they were sent. This is particularly problematic for references to the same address in a shared memory machine, where references may be sent in program order and must not be re-ordered in the network. Certain coherence protocols and messaging protocols may also rely upon ordering of certain packets in the interconnect.

What is needed is a system and method for reducing non-uniform traffic distributions in computer system interconnects that preserves packet ordering when necessary.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
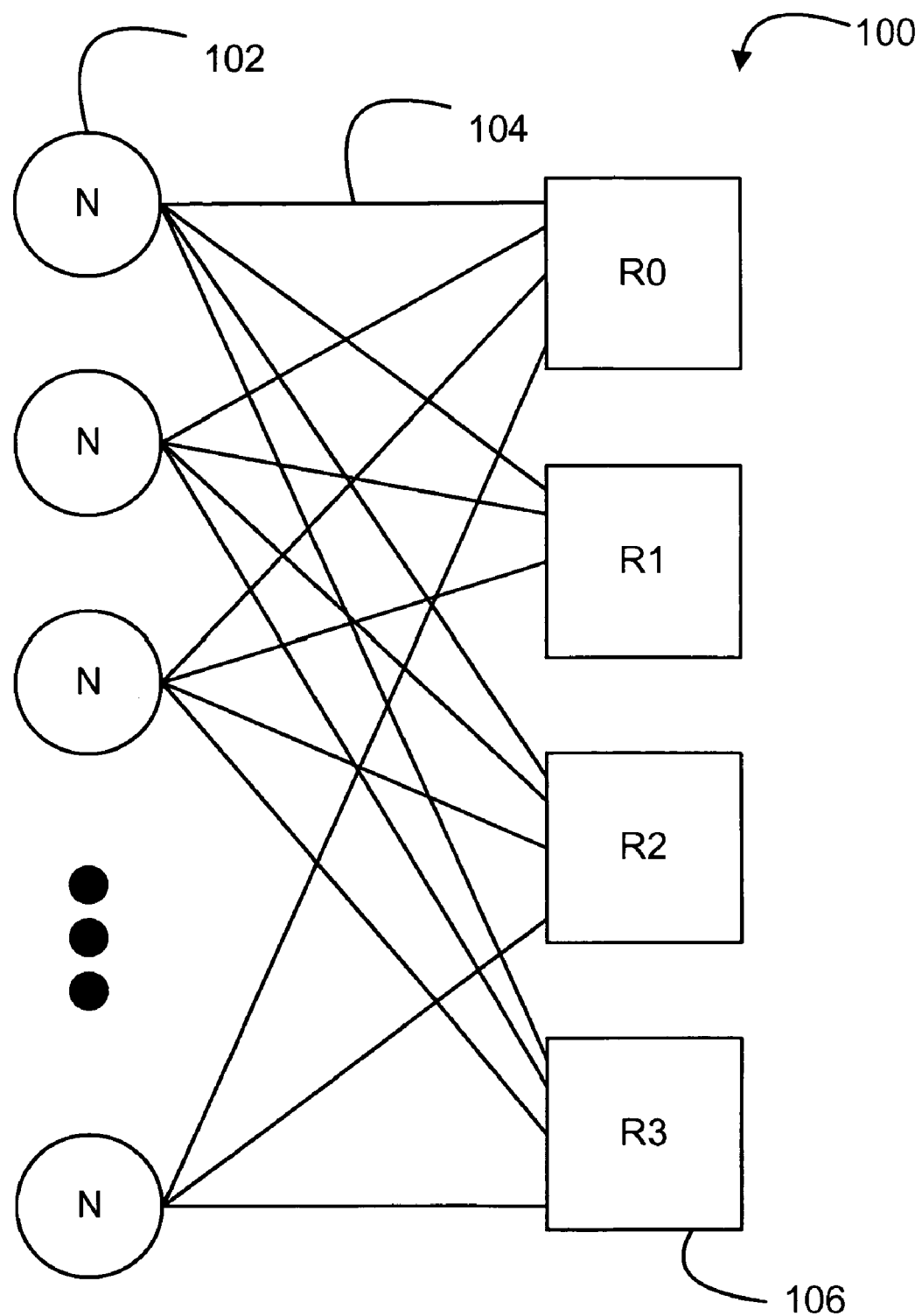
FIG. 1 illustrates a computer system.
Figure 2:
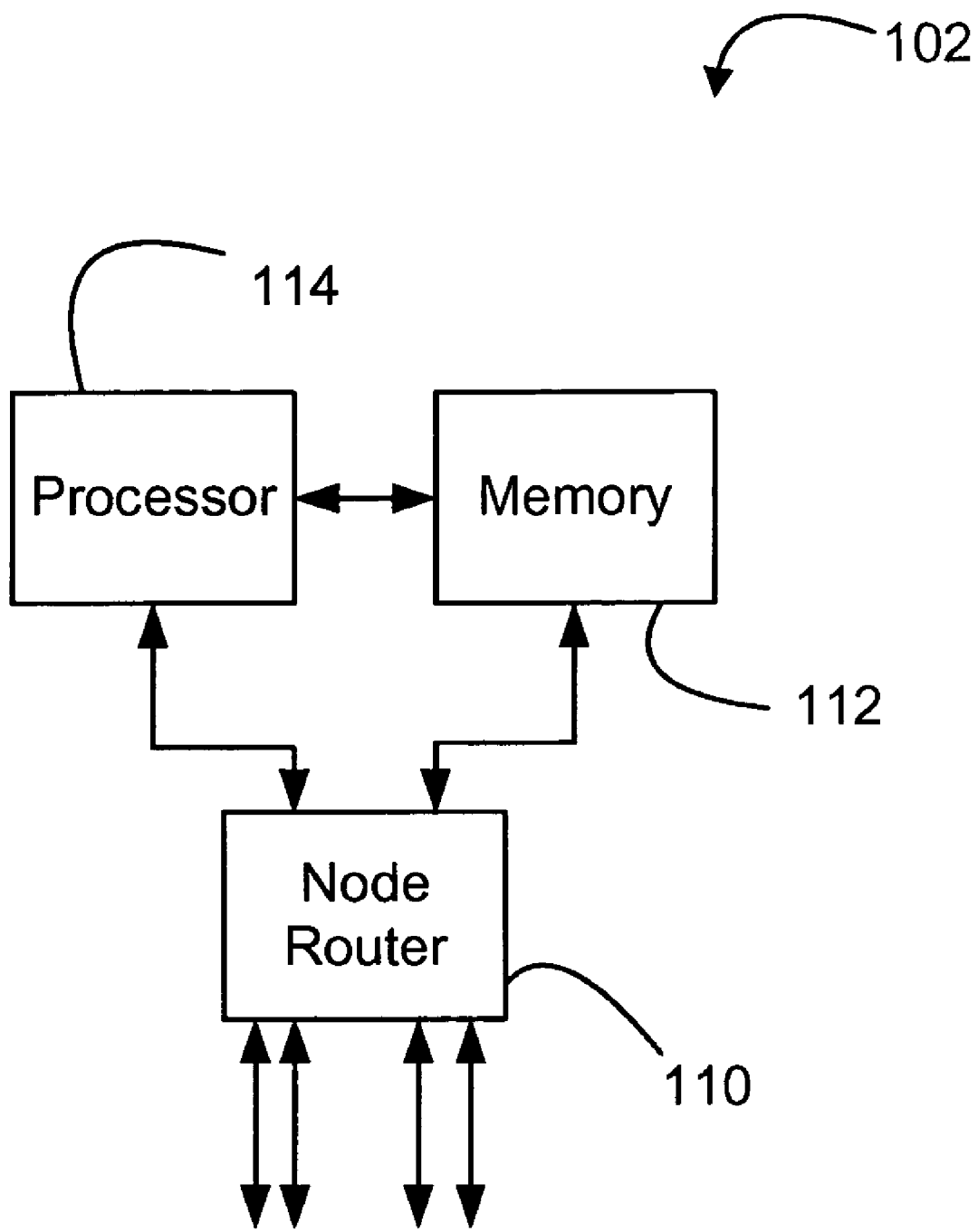
FIG. 2 illustrates a node within the computer system of FIG. 1.

A computer system is shown in FIG. 1. In the computer system 100 of FIG. 1, processor nodes 102.1 through 102.N are connected by links 104 to routers 106. As shown in FIG. 2, each processor node 102 includes a node router 110, local memory 112 and one or more processors 114. Bandwidth spreading is used to minimize hot spots in network traffic between processor nodes.

In one embodiment, system 100 performs bandwidth spreading in fat-tree and other networks by choosing unique network paths based on a packet's source, destination and memory address, while preserving network ordering for a given address. Such an approach provides automatic load balancing in the network, significantly reducing network hot spots and their associated performance degradation.

Each node router 110 uses a bandwidth spreading mechanism on data flowing upstream to provide automatic load balancing in a deterministic manner. The bandwidth spreading mechanism is designed to work in a fat-tree network, but will work, to varying degrees of effectiveness, in other network topologies. The bandwidth spreading mechanism operates when multiple minimal routing choices are present to select a particular minimal routing choice as a mathematical function of packet attributes.

In one embodiment, for routing steps in which multiple minimal routing choices are available, such as upward hops in a fat-tree network, the hop to take is chosen by a hash function of several values: the destination node number, the current router input port, and portions of the target memory address being referenced. In another embodiment other fields are used in the hash function, such as a message ID.

The hash value that is produced for a packet is then used to direct the packet to one of the allowable output ports. By using the packet's target memory address, multiple packets of a block transfer between two endpoints are spread out over different router output links.

In one embodiment, computer system 100 includes thirty-two processor nodes 102 and each router 106 supports up to thirty-two ports. In one such embodiment, packets are spread uniformly over the set of available outputs using a flexible modulo function that can accommodate when the number of ports is not a power-of-two.

For instance, in one such embodiment, bandwidth can be spread over sets of 1, 2, 3, 4, 5, 6, 7, 8, 10, 12, 14, 16, 20, 24, 28 or 32 ports. In one such embodiment, the number of ports must be a power of two times an optional factor of 3, 5 or 7. That is, Number of ports=$2^{M}$*{1,3,5, or 7}, where $M$ is an integer>=0

This allows bandwidth spreading to be used even when the number of available output ports is not a factor of two, such as when a fat tree is configured with a non-power-of-two number of uplinks at some stage, or when some number of uplinks in a fat-tree have become disabled due to faults.

Figure 3:
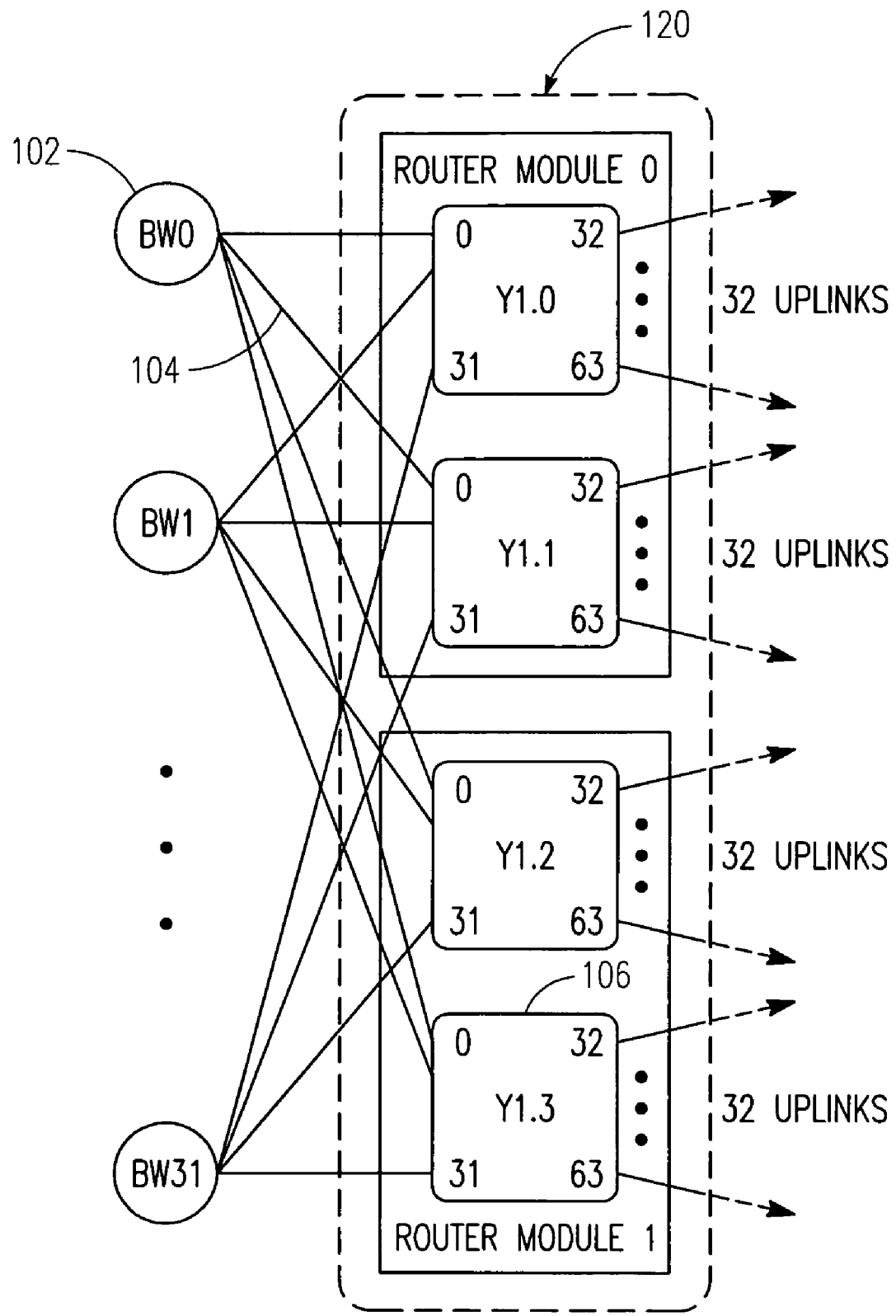
FIG. 3 illustrates another computer system.

A second computer system is shown in FIG. 3. In the computer system 120 of FIG. 3, processor nodes 102.1 through 102.N are connected by links 104 to routers 106. Each processor node 102 includes a node router 110, local memory 112 and one or more processors 114. Bandwidth spreading is used to minimize hot spots in network traffic between processor nodes.

In the embodiment shown in FIG. 3, computer system 120 uses high-radix routers 106, each of which has 64 ports that are three bits wide in each direction. In the embodiment shown, each processor node 102 has four injection ports into the network, with each port connecting to a different network slice. Each slice is a completely separate network with its own set of routers 106. The discussion of the topology in this section focuses on a single slice of the network.

In one embodiment, computer system 120 scales up to 32K processors using a variation on a folded-Clos or fat-tree network topology that can be incrementally scaled. In one such embodiment, computer system 120 is packaged in modules, chassis, and cabinets. Each compute module contains eight processors with four network ports each.

In one embodiment, a chassis holds eight compute modules organized as two 32-processor rank 1 (R1) subtrees, and up to four R1 router modules (each of which provides two network slices for one of the subtrees). Each R1 router module contains two 64-port YARC router chips (FIG. 3) providing 64 downlinks that are routed to the processor ports via a midplane, and 64 uplinks (or sidelinks) that are routed to eight 96-pin cable connectors that carry eight links each.

Figure 4A:
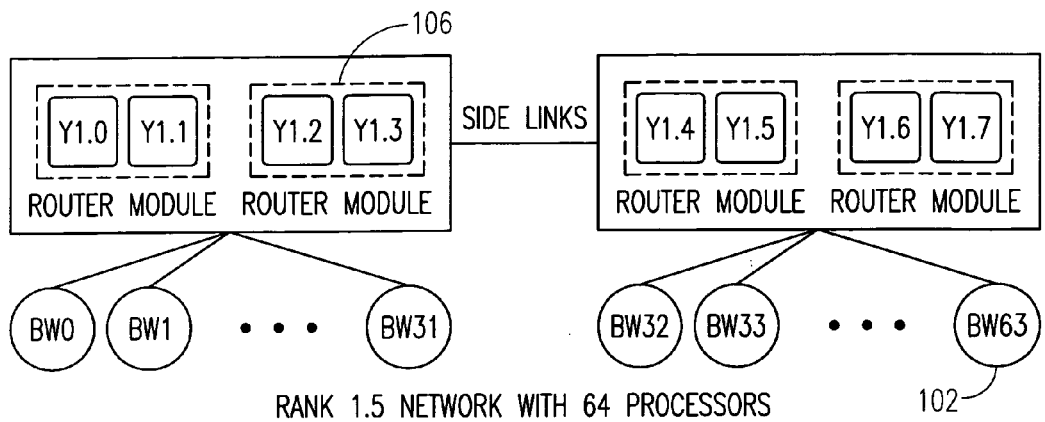
FIG. 4 (*a*)-(*c*) illustrate network topologies for computer systems.
Figure 4B:
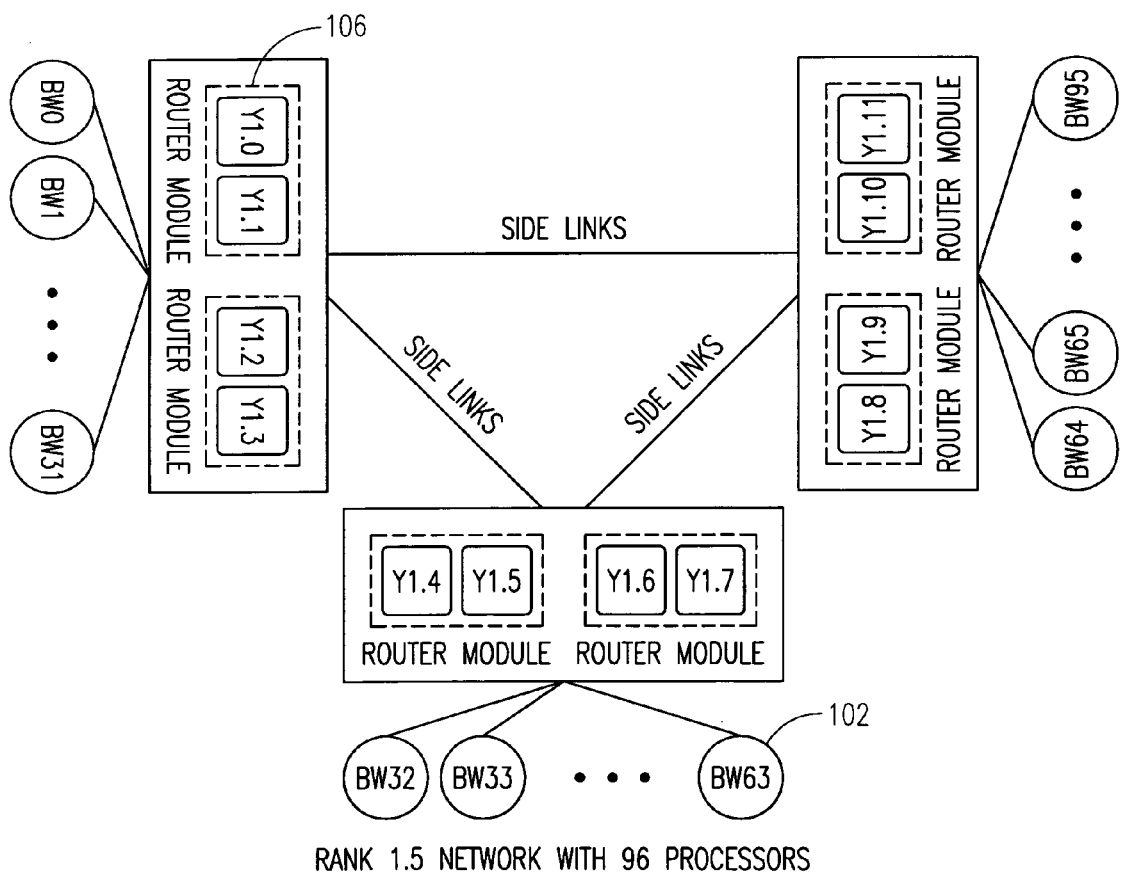

Each cabinet holds two chassis (128 processors) organized as four 32-processors R1 subtrees. Machines with up to 288 processors, nine R1 subtrees, can be connected by directly cabling the R1 subtrees to one another using sidelinks as shown in FIGS. 4(a) and (b) to create a rank 1.5 (R1.5) network.

Figure 4C:
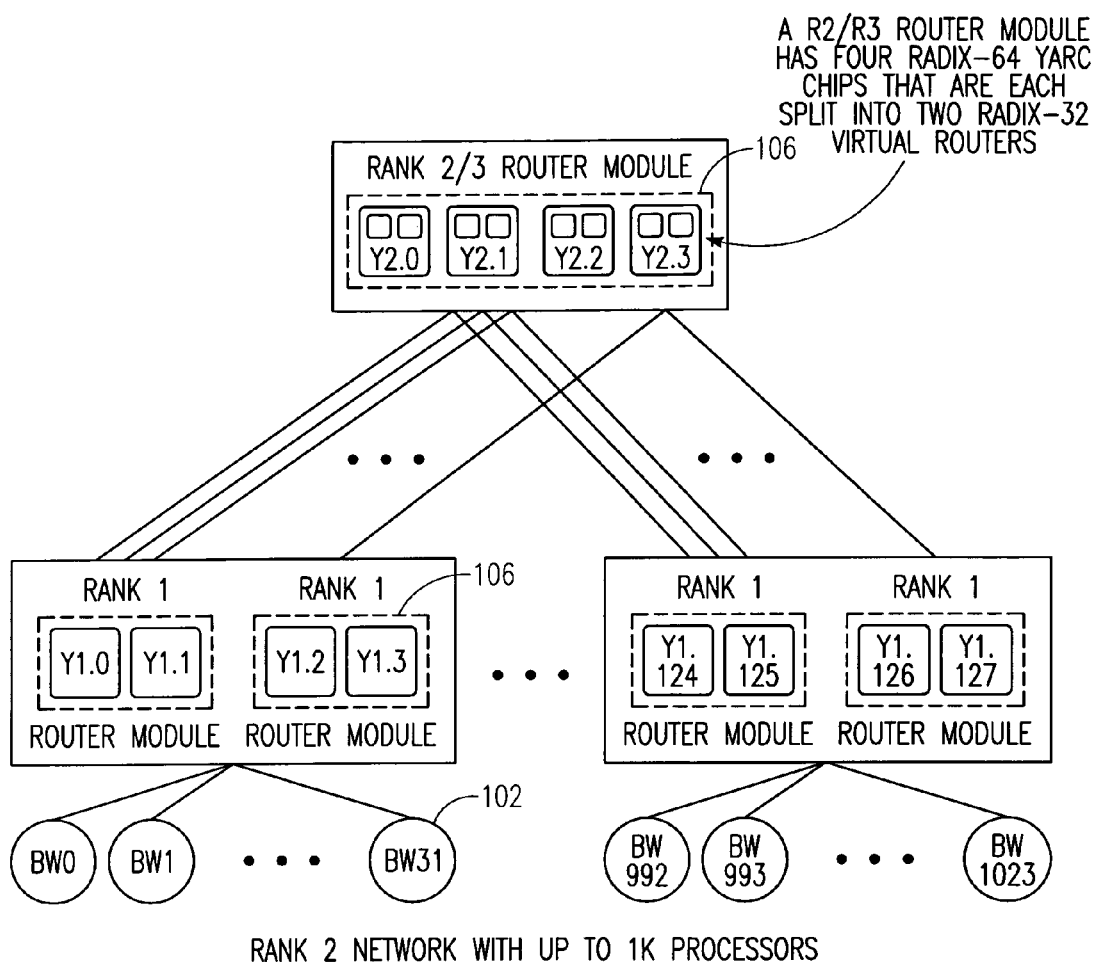

To scale beyond 288 processors, the uplink cables from each R1 subtree are connected to rank 2 (R2) routers. A rank 2/3 router module (FIG. 4(c)) packages four routers 106 on an R2/R3 module.

In one embodiment, the four radix-64 routers 106 on the R2/R3 module are each split into two radix-32 virtual routers. Logically, each R2/R3 module has eight radix-32 routers providing 256 network links on 32 cable connectors. Up to 16 R2/R3 router modules are packaged into a stand-alone router cabinet.

Machines of up to 1024 processors can be constructed by connecting up to 32 32-processor R1 subtrees to R2 routers. Machines of up to 4.5K processors can be constructed by connecting up to 9 512-processor R2 subtrees via side links. Up to 16K processors may be connected by a rank 3 (R3) network where up to 32 512-processor R2 subtrees are connected by R3 routers. In theory networks up to 72K processors could be constructed by connecting nine R3 subtrees via side links.

The above topology and packaging scheme enables very flexible provisioning of network bandwidth. For instance, by only using a single rank 1 router module (instead of two as shown in FIG. 3), the port bandwidth of each processor is reduced in half—halving both the cost of the network and its global bandwidth. An additional bandwidth taper can be achieved by connecting only a subset of the rank 1 to rank 2 network cables, reducing cabling cost and R2 router cost at the expense of the bandwidth taper.

Embodiments of computer systems 100 and 120 are described in "HIGH-RADIX INTERPROCESSOR COMMUNICATIONS SYSTEM AND METHOD," U.S. patent application Ser. No. 12/107,011, filed herewith, the description of which is incorporated herein by reference.

In one embodiment, routing in computing system 120 is performed on variable length packets. The first phit of a packet is the header, which contains all the mandatory routing fields, and the last phit of a packet is an end of packet (EOP) phit which contains the packet checksum.

In a folded-Clos topology, packet routing is performed in two stages: routing up to a common ancestor of the source and destination processors, and then routing down to the destination processor. Up routing can use either adaptive or deterministic routing. Downrouting, however, is always deterministic, as there is only a single path down the tree from any router to a destination processor.

In systems 120 which have a memory consistency model requires that requests to the same address maintain ordering in the network, request packets should use deterministic routing. Response packets do not require ordering, and so can be routed adaptively.

Packet routing is algorithmic and distributed. At each hop in the network, routing logic at the head of the input queue calculates the output port for the local router. This is performed using routing registers and an eight-entry routing table. The routing logic is replicated in each tile, allowing multiple virtual routers per physical router and providing the needed bandwidth for parallel routing in all 64 tiles.

In the embodiments shown in FIG. 4(a) and (b), there are three types of links (i.e., routes): uplinks, sidelinks and downlinks. Uplinks go from the injection port to a rank 1 router or from a rank n router to a rank n+1 router. Sidelinks go from a rank n router to a peer rank n router (only for R1.5, R2.5 and R3.5 networks). Downlinks go from a rank n router to a rank n−1 router or from a rank 1 router to the destination processor.

En route from the source to the common ancestor, the packet will take either an uplink or a sidelink depending on the class of the network (e.g.: rank 2 or rank 2.5, respectively). Upon arrival at the common ancestor, the router begins routing the packet down the fat tree toward its final destination using the downlinks.

In one embodiment, the down route is accomplished by extracting a logical port number directly from the destination processor number. In one such embodiment, each router 106 in computer system 120 has 64 ports which have both a physical number, and an arbitrary logical number. System software performs network discovery when the system is initialized and assigns a logical port number to each physical port number.

A system and method for flexible routing is described in "FLEXIBLE ROUTING TABLES FOR A HIGH-RADIX ROUTER," U.S. patent application Ser. No. 12/107,016, filed herewith, the description of which is incorporated herein by reference.

Figure 5:
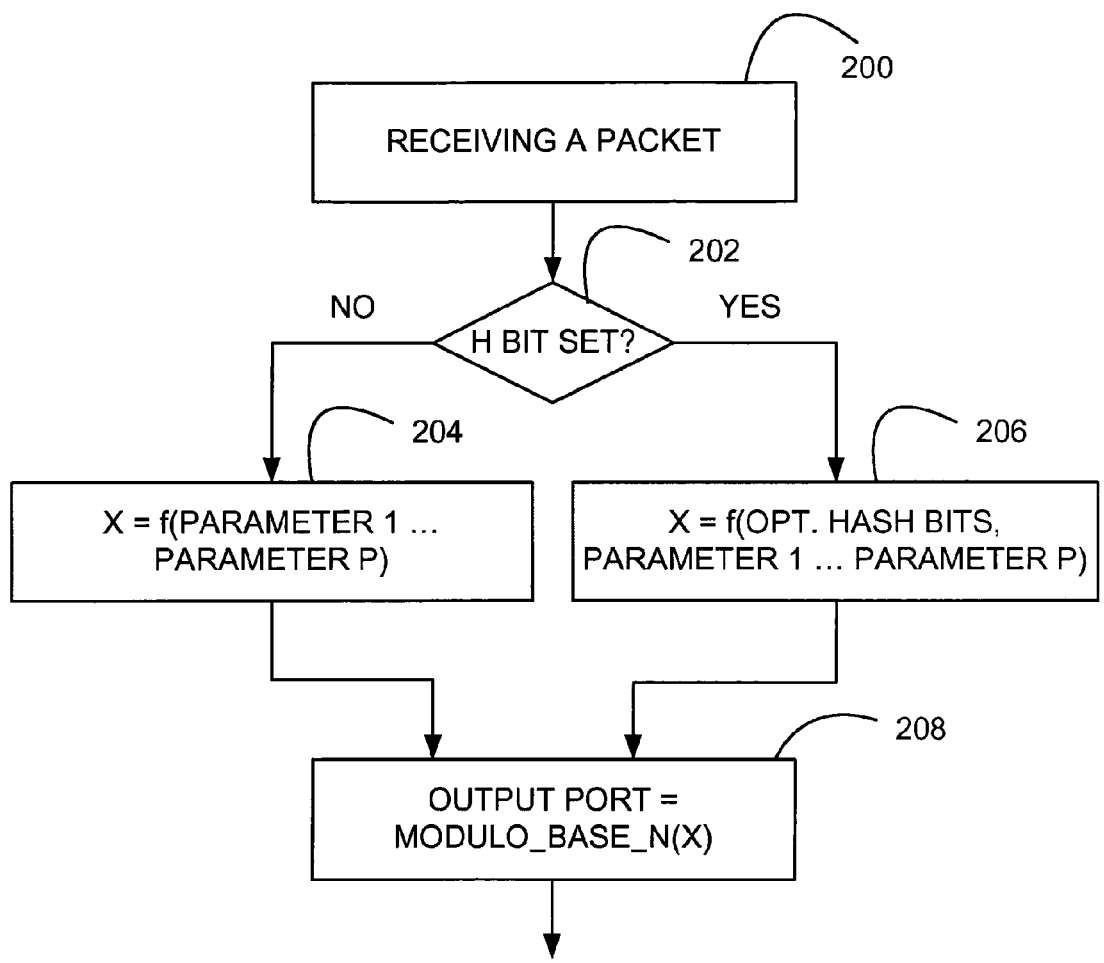
FIG. 5 illustrates a method of calculating an output port according to the present invention.

The bandwidth spreading mechanism operates when multiple minimal routing choices are present to select a particular minimal routing choice as a mathematical function of packet attributes. In one embodiment, for deterministic routing, a packet's uplink or sidelink is chosen at each hop by computing a hash value and then performing a modulo over the number of configured ports. One embodiment of a method of bandwidth spreading is shown in FIG. 5.

In one embodiment, system 120 performs bandwidth spreading by choosing unique network paths based on a packet's source, destination and memory address, while preserving network ordering for a given address. Such an approach provides automatic load balancing in the network, significantly reducing network hot spots and their associated performance degradation.

In one embodiment, router 106 calculates exact modulos of 1, 2, 3, 4, 5, 6, 7, 8, 10, 12, 14, 16, 20, 24, 28 or 32 ports, by factoring the divisor into a power-of-two component, and a factor of 1, 3, 5 or 7. Division by 3, 5 or 7 is easy to compute via the binary equivalent of the "casting out nines" technique for verifying long multiplication.

In one such embodiment, the hash function is an XOR of the input port, destination number, and one or more optional hash bits. In one embodiment, the optional hash bits are included if an "h" bit is set in the packet header. The optional hash bits may include address bits or other identifiers. One such embodiment is shown in FIG. 5. In one embodiment, the optional hash bits include a portion of the packet address offset.

In the bandwidth spreading method of FIG. 5, at 200, the router receives a packet having two or more fields. If the "h" bit is set at 202, control moves to 206 and a first number "X" is computed as a function of one or more parameters and the optional hash bits. In one such embodiment, X is a hash of the input port, the destination number and the optional hash bits. The output port is then selected at 208 by performing a modulo N operation on X, where N is the number of output ports that provide minimal routes.

If the "h" bit is not set at 202, control moves to 204 and a first number "X" is computed as a function of one or more parameters without using the optional hash bits. In one such embodiment, X is a hash of the input port and the destination number. The output port is then selected at 208 by performing a modulo N operation on X, where N is the number of output ports that provide minimal routes.

In one bandwidth spreading embodiment, system 120 maps address bits Address[20:6] into the hash region of the packet header, providing high diversity across packets, yet preserving in-order delivery of request packets on a per-cacheline basis. In another embodiment, the desired address bits are extracted from the packet itself.

Address hashing allows the packets of a block transfer between two network endpoints to be spread out among multiple paths in the network. If address hashing is disabled, then all packets between two endpoints and injected on the same network rail will take the same path through the network.

In one embodiment, the field used to select the address bits used in the hash function can be uniquely configured for each input port. For instance, in one embodiment, only an 8-bit subset of the 15-bit optional hash bits are actually used by the hash function and each tile has a configuration register which indicates the bits to use. By only using a subset of the optional hash bits, we can hash on different bits at different ranks within the network.

For instance, in one embodiment, a different portion of the address bits is used at each level of the fat-tree. This is important, because if certain address bits are used to steer packets onto the uplinks of routers at one level of the fat-tree, then at the next level up, the stream of incoming packets at a given router will lack diversity in these address bits. This router can thus be configured to use different address bits in the hash function it uses to calculate the output ports from its router. By hashing on unique address bits at each level of the fat-tree, the traffic for a block transfer between two network endpoints is spread over all possible roots of the fat-tree.

For example, the rank 1 routers might hash using hash bits 0 . . . 7, rank 2 routers hash using bits 5 . . . 12, and rank 3 routers hash using bits 10 . . . 14. In this way, we prevent successive routers from hashing on the same bits as the packet moves up the tree. A router with n uplinks will tend to "use up" the least significant log 2(n) hash bits it employs. A parent of that router will see an incoming stream of packets with little or no diversity in these bits, as they were used to select the parent. Therefore, the parent should use a different set of the optional hash bits in order to maximize the diversity in the hash function. Or a different field or parameter, such as message ID or subswitch ID could be used in one of the ranks.

Once the hash value is computed for a packet, the modulo is computed. In order to efficiently implement this operation, in one embodiment router 106 restricts the number of valid output ports for deterministic up/side routing to one of the following values: 1, 2, 3, 4, 5, 6, 7, 8, 10, 12, 14, 16, 20, 24, 28, 32. In such an embodiment, if a configuration has, say, 32 configured uplinks, and one of them is not available for a given destination due to a fault, then the routing table must drop down to 28 links for that destination. Adaptive packets could still route over all 31 available links, as the adaptive port mask supports an arbitrary set of ports.

Restricting the number of links to the above values means that the modulo operation can be factored into a power-of-two component, and optional factor of 3, 5 or 7. Division by 3, 5 or 7 is easy to compute via the binary equivalent of the "casting out nines" technique for verifying long multiplication.

As an example, a mod 24 operation can be computed by using the bottom three bits of the hash value to provide a mod 8, and computing a mod 3 on the remaining bits. Say the hash value was 0xb5. The hash value mod 8 is simply the lower three bits, which equal 5. The remaining 5 bits are 0x16 (22 in decimal), which equal 1, mod 3. Thus, the hash value mod 24 is 1*8+5=13.

The routing table entry stores the control codes for implementing this modulo operation. Each of the supported modulo divisors is broken into an upper and a lower factor. The upper factor is either 1, 3, 5 or 7, and the lower factor is a power of two from 1 to 32. The modulo of the hash value is computed by selecting some number of lower bits, corresponding to the power-of-two factor, and then computing the remainder of the remaining bits divided by the upper factor and concatenating this with the lower bits.

Control codes can be used to configure deterministic routing. In one embodiment, the control codes are stored in the routing table entries. For example, a routing table entry for a destination with 12 allowable sidelinks would use modulo control codes of (1,2). This would instruct the modulo logic to perform a mod 12 operation on the hash value, computing an index in the range 0 to 11, which would then be used to select on of the 12 specified output ports for routing.

The approach described above provides network load balancing in a network, which effectively removes network hotspots and can substantially improve network performance, without sacrificing network ordering for packets between two endpoints for the same address.

The approach differs from both adaptive routing and randomized oblivious routing in that it is deterministic, and preserves network ordering for packets sent between the same endpoints for the same address.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of distributing packets across a plurality of output ports, comprising:
   receiving a packet, wherein the packet includes a plurality of fields;
   computing a first number as a function of one or more of the plurality of fields;
   computing a second number that modulo base N of the first number; and
   selecting an output port as a function of the second number.

2. The method of claim 1, wherein the packet includes a destination number and wherein computing a first number includes hashing an input port and the destination number.

3. The method of claim 1, wherein the packet includes a destination number and wherein computing a first number includes computing an XOR of an input port and the destination number.

4. The method of claim 1, wherein the packet includes a destination number and two or more optional hash bits and wherein computing a first number includes hashing an input port with the destination number and the optional hash bits.

5. The method of claim 1, wherein the packet includes a destination number and two or more optional hash bits and wherein computing a first number includes hashing the destination number with the optional hash bits.

6. The method of claim 1, wherein the packet includes a destination number and two or more optional hash bits and wherein computing a first number includes computing an XOR of an input port with the destination number and the optional hash bits.

7. The method of claim 1, wherein the packet includes a destination number, a control bit and two or more optional hash bits and wherein computing a first number includes:
   if the control bit is not set, hashing an input port with the destination number; and
   if the control bit is set, hashing an input port with the destination number and the optional hash bits.

8. The method of claim 1, wherein the packet includes a destination number, a control bit and two or more optional hash bits and wherein computing a first number includes:
   if the control bit is not set, hashing the destination number; and
   if the control bit is set, hashing the destination number with the optional hash bits.

9. An article comprising a Non-transitory computer readable medium having instructions stored thereon, wherein the instructions, when executed in a computer, create a system for executing the method of claim 1.

10. A method of distributing packets across a plurality of uplink and sidelink ports, comprising:
    receiving a packet, wherein the packet includes a plurality of fields; computing a first number as a function of one or more of the plurality of fields; determining whether the packet is to be routed to an uplink port or a sidelink port;
    if the packet is to be routed to an uplink port, computing a second number that modulo base N of the first number, and selecting an uplink port as a function of the second number; and
    if the packet is to be routed to a sidelink port, computing a second number that modulo base M of the first number, and selecting a sidelink port as a function of the second number.

11. The method of claim 10, wherein the packet includes a destination number and wherein computing a first number includes hashing an input port and the destination number.

12. The method of claim 10, wherein the packet includes a destination number and wherein computing a first number includes computing an XOR of an input port and the destination number.

13. The method of claim 10, wherein the packet includes a destination number and two or more optional hash bits and wherein computing a first number includes hashing an input port with the destination number and the optional hash bits.

14. The method of claim 10, wherein the packet includes a destination number and two or more optional hash bits and wherein computing a first number includes hashing the destination number with the optional hash bits.

15. The method of claim 10, wherein the packet includes a destination number and two or more optional hash bits and wherein computing a first number includes computing an XOR of an input port with the destination number and the optional hash bits.

16. The method of claim 10, wherein the packet includes a destination number, a control bit and two or more optional hash bits and wherein computing a first number includes:

if the control bit is not set, hashing an input port with the destination number; and if the control bit is set, hashing an input port with the destination number and the optional hash bits.

17. The method of claim 10, wherein the packet includes a destination number, a control bit and two or more optional hash bits and wherein computing a first number includes:

if the control bit is not set, hashing the destination number; and if the control bit is set, hashing the destination number with the optional hash bits.

18. An article comprising a Non-transitory computer readable medium having instructions stored thereon, wherein the instructions, when executed in a computer, create a system for executing the method of claim 10.

19. A computer system, comprising:

a plurality of processor nodes;

a plurality of first routers; and a plurality of second routers;

wherein each first router is connected to a processor node and to two or more second routers and wherein each first router includes means for receiving a packet having a plurality of fields and means for computing a first number as a function of two or more of the plurality of fields; and wherein each first router further includes an uplink route selector which selects an uplink from N possible uplinks to the second routers, wherein the uplink route selector includes:

means for computing a second number that is modulo base N of the first number; and means for selecting the uplink as a function of the second number.

20. The system according to claim 19, wherein each first router further includes a sidelink route selector which selects a sidelink from M possible sidelinks to the other first routers, wherein the sidelink route selector includes:

means for computing a second number that is modulo base M of the first number; and means for selecting the sidelink as a function of the second number.

21. The system according to claim 20, wherein the means for computing a first number includes means for determining whether to compute the first number as a function of optional hash bits.

22. The system according to claim 19, wherein the means for computing a first number includes means for determining whether to compute the first number as a function of optional hash bits.

* * * * *